United States Patent [19]

Ilon

[11] Patent Number: 4,799,522

[45] Date of Patent: Jan. 24, 1989

[54] SNOW CHAIN FOR VEHICLE WHEELS

[75] Inventor: Bengt E. Ilon, Lucerne, Switzerland

[73] Assignee: Autotyp S.A., Etagnieres, Switzerland

[21] Appl. No.: 938,160

[22] Filed: Dec. 4, 1986

[30] Foreign Application Priority Data

Dec. 20, 1985 [DE] Fed. Rep. of Germany ....... 3545529

[51] Int. Cl.$^4$ ............................................ B60C 27/20
[52] U.S. Cl. .............................. 152/213 R; 24/69 TT; 29/453; 59/84; 59/93; 152/218; 152/224; 152/241
[58] Field of Search ................... 152/208, 213 R, 214, 152/216, 217-219, 223, 239, 241, 242, 213 A, 210, 224; 81/15.8; 24/69 TT, 483; 29/453; 59/84, 90, 91, 93

[56] References Cited

U.S. PATENT DOCUMENTS

| 1,681,125 | 8/1928 | Markwick | 152/208 X |
| 1,952,944 | 3/1934 | Ruffertshofer | 152/223 |
| 4,357,975 | 11/1982 | Baldry | 152/223 |
| 4,388,754 | 6/1983 | Ilon | 152/216 X |
| 4,408,645 | 10/1983 | Dohmeier | 152/223 X |

Primary Examiner—Michael W. Ball
Assistant Examiner—Thomas Bokan
Attorney, Agent, or Firm—Foley & Lardner, Schwartz, Jeffery, Schwaab, Mack, Blumenthal & Evans

[57] ABSTRACT

The present invention relates to a snow chain for vehicle wheels, whereby the snow chain comprises two chain members adapted to extend along the peripheral tread surface of the vehicle wheel when the snow chain is mounted on said wheel. The snow chain comprises tie bars connecting the chain members to each other and adapted to extend transversely to the tread surface when the snow chain is mounted on the vehicle wheel. The snow chain preferably is mounted on arms which are foldable relative to each other and retractable to a position adjacent an end side of the vehicle wheel by means of a retraction device. In order to improve the grip between the snow chain and a ground (road), each tie bar is non-rotatably connected to the two chain members extending along the peripheral tread surface of the vehicle wheel in order to utilize the chain members for preventing the tie bars from turning or rotating from predetermined, preferably upright or standing positions relative to the tread surface when the tie bars, during rolling of the vehicle wheel, are positioned between the tread surface and the ground.

5 Claims, 5 Drawing Sheets

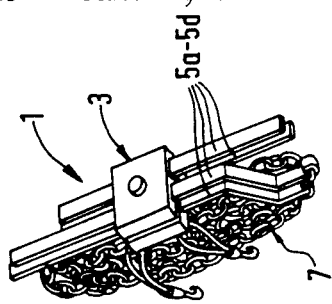
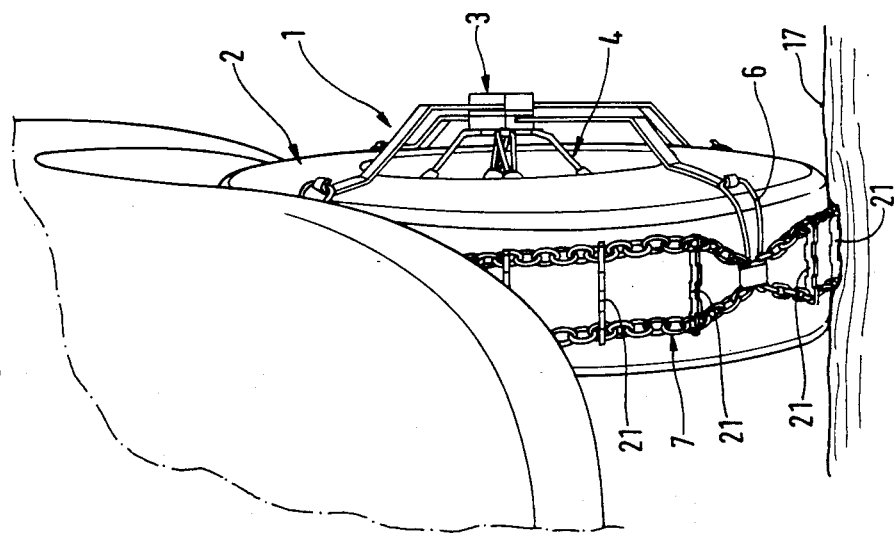
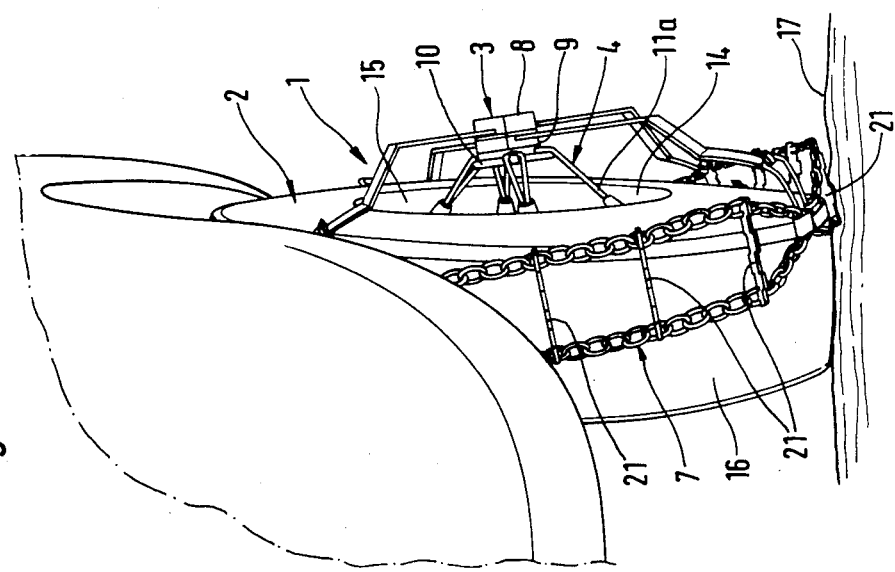

SNOW CHAIN FOR VEHICLE WHEELS

BACKGROUND OF THE INVENTION

1. Field of the Invention

The present invention relates to a snow chain for vehicle wheels, whereby the snow chain comprises two chain members adapted to extend along the peripheral thread surface of the vehicle wheel when the snow chain is mounted on the wheel. The snow chain comprises tie bars connecting the chain members to each other and adapted to extend transversely to the tread surface when the snow chain is mounted on the vehicle wheel. The snow chain preferably is mounted on arms which are foldable relative to each other and retractable to a position adjacent an end side of the vehicle wheel by means of a retraction device.

2. Description of Related Art

Snow chains of the above type are already known from U.S. patent specification 4,388,754. These prior art snow chains have tie bars in the form of rigid wires or round irons with substantially circular cross section. The end portions of the wires or round irons are bent to loops through which chain links extend with clearance.

SUMMARY OF THE INVENTION

It has been noticed that tie bars with this shape do not provide the grip required by the snow chain during driving on slippery ground (road). This problem can be eliminated by forming the tie bars with a longitudinal cross section placing them such that they assume a standing or upright position on the tread surface of the tire when the snow chain is mounted on the vehicle wheel. A problem is that the tie bars will not remain in standing or upright position when they hit the ground, but rotate to a position lying down, whereby the intended improvement is completely or partially lost.

The object of the present invention is to eliminate this problem and to provide simple means that retain the tie bars substantially in predetermined positions relative to the tread surface of the vehicle wheel.

While the tie bars are non-rotatably connected to the chain members, the chain members retain the tie bars substantially in their standing or upright position, because chain members are prevented from lifting from the tread surface while they are held stretched against the tread surface when the vehicle wheel rotates and while the ground (road) and/or snow, ice, etc. press the chain members against said tread surface. Another advantage obtained while the tie bars are non-rotatably connected to the chain members, is that chain links of said chain members are prevented from rotating relative to each other beyond a certain limit.

BRIEF DESCRIPTION OF THE DRAWINGS

The invention will be further described below with reference to the accompanying drawings, in which

FIG. 7 is a perspective view of a snow chain of FIG. 1 provided on the vehicle wheel before said chain is retracted;

FIG. 8 is a perspective view of a snow chain of FIG. 1 provided on the vehicle wheel after said chain is retracted to said wheel with the chain members disposed on the tread surface of the wheel; and FIG. 9 is a perspective view of the snow chain of FIG. 1 holding arms in folded positions.

DESCRIPTION OF THE PREFERRED EMBODIMENT

Figure 6:
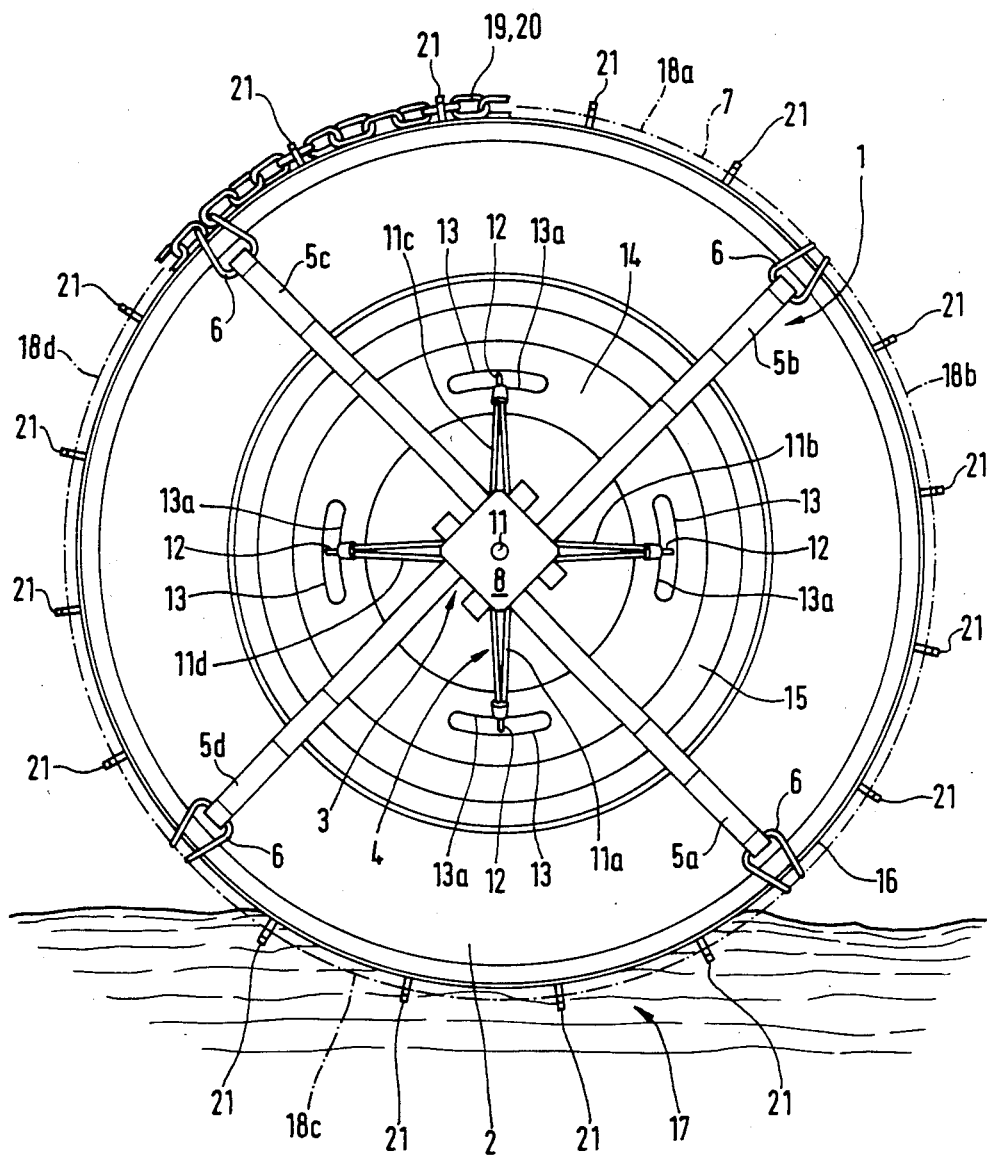
FIG. 6 is a side view of a vehicle wheel with a snow chain of FIG. 1 provided thereon.

In the drawings, a skid protetion device 1 for vehicle wheels 2 is illustrated. The skid protection device 1 comprises a centre member 3 with a retraction device 4 and arms 5a114 5d with yokes 6 on which a snow chain 7 is provided. The centre member 3 has three plates 8, 9 and 10 which are pivotally journalled on a bolt 11 (see FIG. 6). The plate 8 has grooves for the arms 5a and 5b and the plate 9 has grooves for the arms 5c and 5d. The retraction device 4 comprises four rubber straps 11a–11d provided on the plate 10 and having hook means 12 which are insertable in holes 13 in the rim 14 of the vehicle wheel 2 and fastenable on the edges 13a of said holes 13.

The skid protection device 1 is mounted by placing it at the end side 15 of the vehicle wheel 2 with the snow chain 7 on the tread surface 16 of the vehicle wheel 2 on top of said wheel and the snow chain close to the tread surface 16 of the vehicle wheel 2 at lower ground engaging portions of said wheel. Thereafter, the rubber straps 11a–11d are stretched and hooked onto the rim 14 (see FIG. 7).

The portions of the snow chain 7 not yet placed on the tread surface 16 are drawn in position when the vehicle wheel 2 is rolling. Thus, the snow chain 7 will follow the movement of the vehicle wheel 2 and when those parts of the snow chain not yet retracted onto the tread surface 16 become free from the ground 17, the rubber straps 11a–11d will retract those parts of thesnow chain 7 not yet retracted via the arms 5a–5d, until the entire snow chain is retracted to a position surrounding the periphery of the tread surface 16 (see FIG. 8).

The rubber straps 11a–11d retain the skid protection device 1 in its operating position at the vehicle wheel 2 during driving and when demounting the skid protection device 1, the rubber straps 11a–11d are simply released from the rim 14 whereafter the skid protection device 1 falls off the vehicle wheel 2 by itself by driving a small distance so that the wheel 2 can make a few revolutions.

The skid protection device 1 may be folded into a small package which is easy to store in any space in the vehicle. This is possible since the plates 8 and 9 are rotatable relative to each other such that all arms 5a–5d may be brought into parallel positions. The arms 5a–5d are also displaceably journalled in the plates 8, 9 such that the length of the package does not exceed the length of one arm (see FIG. 9).

The snow chain 7 comprises four chain sections 18a–18d, each chain section extending between two of the yokes 6 and provided thereon. Each chain section 18a–18d includes two chain members 19 and 20 adapted to extend along the tread surface 16 in peripheral direction. The chain members 19, 20 in each chain section 18a–18d are connected to each other by means of four tie bars 21 which are adapted to extend perpendicular to the peripheral direction of the tread surface 16. Each tie bar 21 consists of a longitudinal flat bar iron, wherein two opposite, longitudinal edges 22, 23 have ridges 24 and depressions 25 between said ridges. The ridges 24 of one edge 22 are disposed substantially opposite to the depressions 25 of the other edge 23, while the depressions 25 of said one edge 22 are disposed substantially opposite to the ridges 24 of said other edge 23.

Each tie bar 21 at each of its two end portions is provided with two clamping portions 26 and 27, which between themselves define an endways open recess 28 having a somewhat larger depth than the width of the oval chain links 28 defining the chain members 19, 20

Figure 1:
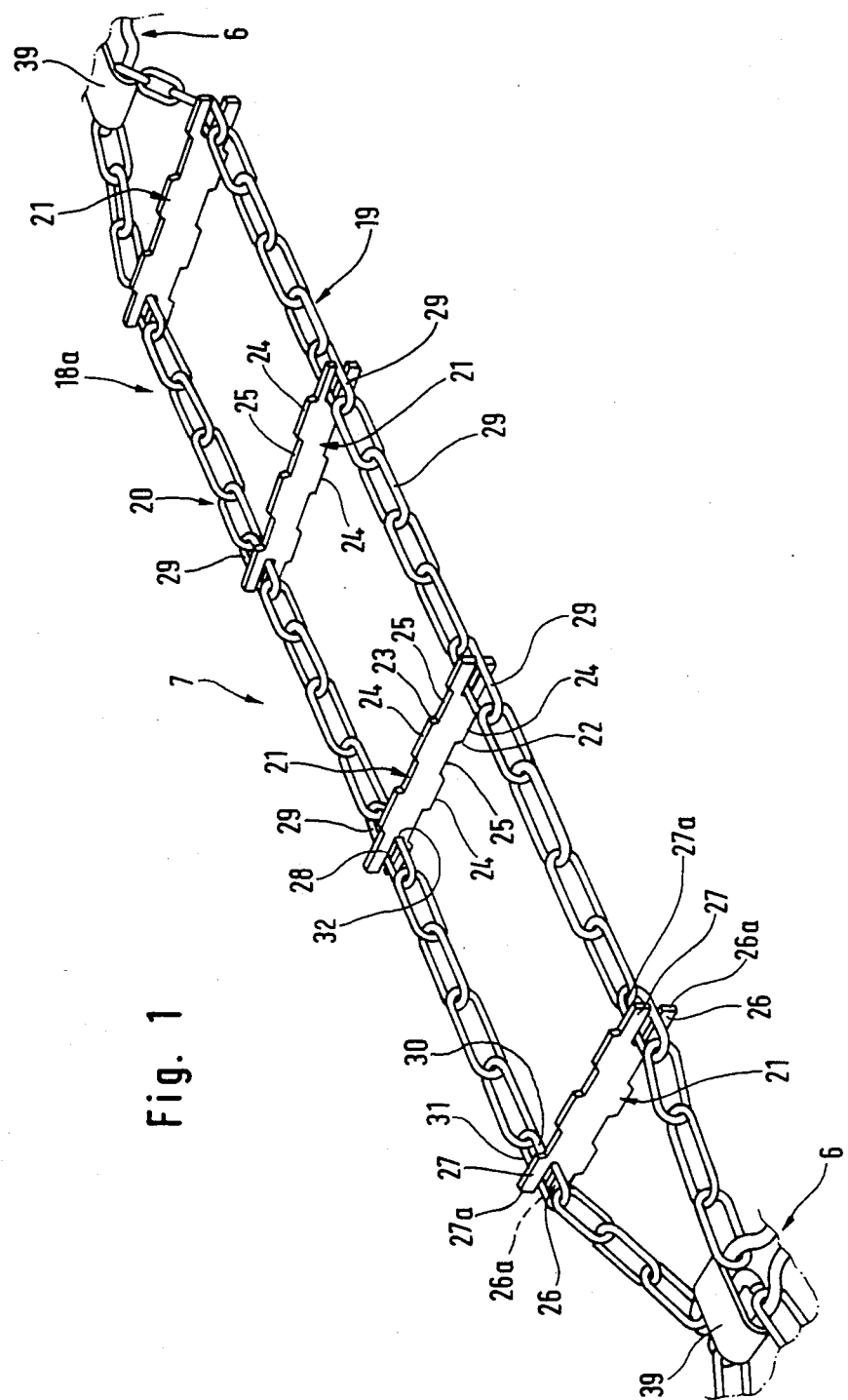
FIG. 1 is a perspective view illustrating a section of a snow chain according to the invention.
Figure 2:
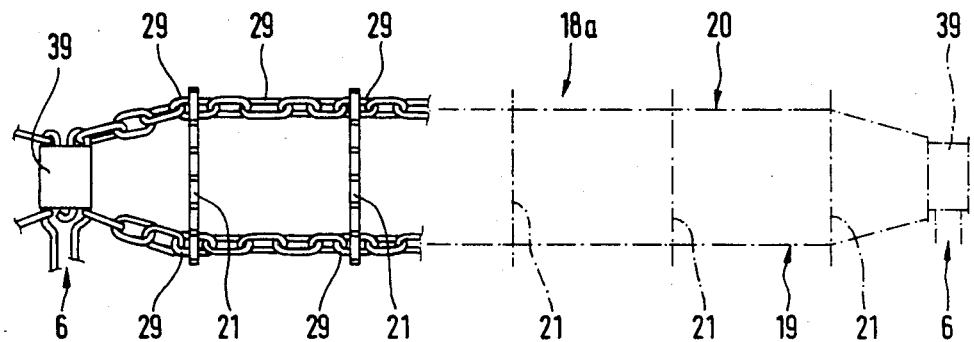
FIG. 2 is a plan view of the chain section of FIG. 1.

Each chain member 19, 20 is formed by inserting, in horizontal position, the fourth chain link 29 from one end of the chain member 19 into one of the recesses 28 of the tie bars 21, until one of its two substantially parallel chain link portions 30 and 31 engages the bottom 32 of the recess 28. When this moment is carried out, the end members 26a, 27a of the clamping portions 26, 27 will project outwards somewhat beyond the outermost chain link portion 31 in the recess 28. Thereafter, the clamping portions 26, 27 are compressed in a machine such that they therebetween clamp the chain link 29 in the lying or horizontal position. During this mechanical clamping of the chain link 29, the end members 26a, 27a of the clamping portions 26, 27 positioned outside the chain link potion 31 are also bend towards each other until they engage chain link portion 31 from the outside. By clamping the chain link 29 by means of the clamping portions 26, 27 and bending the end members 26a, 27a inwards, it is not possible to turn the chain link 29 and the tie bar 21 relative to each other in any plane, but instead chain link 28 and tie bar 21 are non-rotatably connected to each other. Thereafter, the second chain member 20 may be fixed in the same manner in the other recess 28 of the tie bar 21. The next tie bar 21 may thereafter be non-rotatably mounted on the fifth chain link 29 of the chain members 19, 20 from the previous tie bar 21 non-rotatably arranged on chain link 29. Before this, the chain members 19, 20 may be turned such that the chain links in between the chain links 29, non-rotatably connected to the tie bars 21, they all have different angles relative to the tread surface 16. This can be accomplished by first arranging the five chain links 29 adjacent the tie bar 21 in a starting position, whereby every second chain link 29 is in a lying or horizontal position and each chain link 28 therebetween in a standing position. Thereafter, the fifth chain link 29 is turned or rotated a whole revolution from its position lying down to another position lying down, which means that the other four chain links 29 also rotate and reach various angular positions in relation to each other (see FIG. 1). After this rotation, the fifth chain link 29 is non-rotatably attached to a tie bar 21, whereafter the chain member 20 is turned or rotated in the same manner and its fifth chain link 28 from the chain link 29 already mounted is also non-rotatably connected to the second tie bar 21. The third and fourth tie bars 21 are non-rotatably connected to the chain links 29 of the chain members 19, 20 in the same way as the first and second tie bars, whereby the chain members 19, 20 between all tie bars 21 are preferably turned or rotated as defined above. As is apparent from FIG. 1, all tie bars 21 are identical and they are preferably arranged in special positions relative to each other so, that the ridges 24 of one of the tie bars 21, in the longitudinal direction of the chain members, are disposed substantially opposite to the depressions 25 in the adjacent tie bar 21, while the depressions 25 of the first tie bar 21 are disposed substantially opposite to the ridges of said latter tie bar 21. This is arrived at while each tie bar is non-rotatably attached to the chain members 19, 20 after a 180° turn relative to an adjacent tie bar 21.

Figure 3:
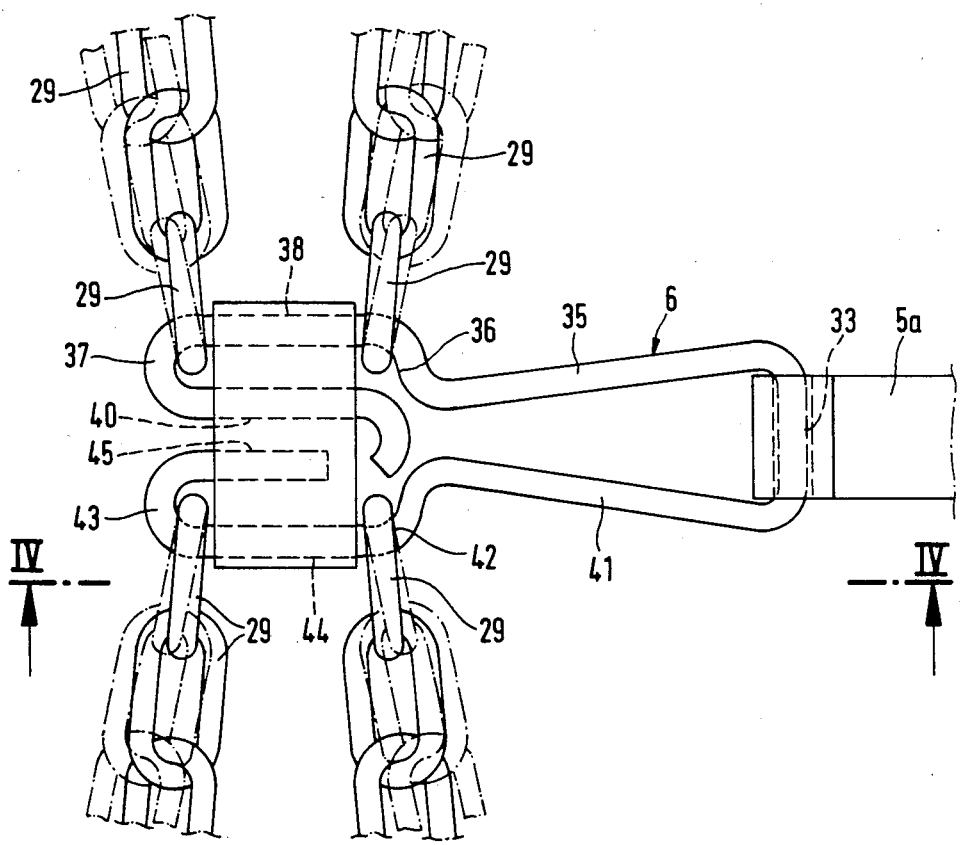
FIG. 3 is a plan view of parts of the snow chain of FIG. 1.
Figure 4:
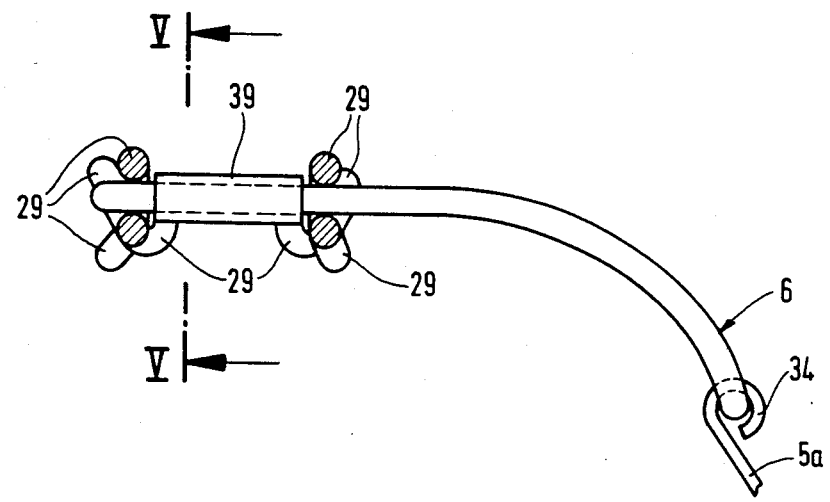
FIG. 4 is a section along line IV—IV in FIG. 3.
Figure 5:
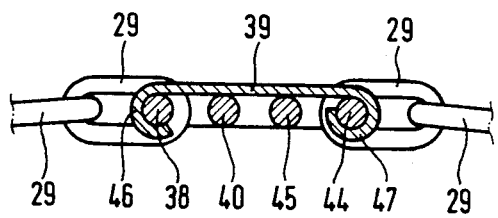
FIG. 5 is a section along line V—V in FIG. 4.

As is apparent from e.g. FIG. 3, each yoke 6 comprises a substantially U-shape bent member of resilient material, e.g. spring steel. The web portion 33 of the yoke 6 projects pivotally through a bent end portion 34 of each arm 5a5d. One yoke shank 35 provides a section 38 defined by yoke portions 36, 37 for mounting two chain links 28 and a locking means 39 for locking said chain links 29 in permanent positions on said section 38. The yoke portion 37 also includes an elongation 40 extending substantially parallel to section 38 and terminating at a small distance from the yoke portion 36.

The other yoke shank 41 provides a section 44, defined by yoke portions 42, 43 for mounting two chain links 29, and the locking means 39 for locking the chain links 29 in permanent positions on section 44. The yoke portion 43 also includes an elongation 45 extending substantially parallel to the section 44 and terminating at such a distance from the yoke portion 42 that the chain links 29 are easy to thread onto the elongation 45.

Mounting of the chain members 19, 20 on the yokes 6 is carried out by first threading one end link 29 of the chain member 19 onto the yoke shank 35 and thereafter one end link 29 of the chain member 20. Similarly, the end link 29 of the chain member 19 of the subsequent chain section is threaded onto theyoke shank 41 and thereafter, the end link 29 of the chain member 20. Thereafter, the locking means 39 is placed between the end links 29 on the section 38 with a flange portion 46 positioned outside the section 38. The yoke shanks 35, 41 are pressed towards each other by hand until the locking means 39 can be pushed down so far between the chain links 29 on the section 44 that another flange portion 47 of said locking means will be positioned outside said section44. By thereafter releasing the yoke shanks 35, 41 and these spring out to the starting position, they engage the flange portions 46, 47 of the locking means 39 with pressure and hereby retain the locking means at the yoke 6. Locking means 39 in turn prevents the chain links 29 from leaving the respective section 38, 44. When each chain section 18a-18d has been mounted on the yokes 6 as defined above, then the snow chain 7 is ready for use.

The length of the snow chain 7 may be quickly reduced for adaptation to a vehicle wheel 2 of a certain size by releasing the locking means 39 from the section44 of the yoke 6 and removing the chain links 29 threaded thereon. Thereafter, the end chain links 29 may be pinched off from the remaining chain links 29 and the chain links 29 constituting end chain links 29 may be threaded onto the section 44, whereafter the locking means 39 is once again put in locking position.

While the tie bars 21 and chain members 19, 20 are non-rotatably connected to each other, the chain members 19, 20 are used to retain the tie bars in their predetermined, substantially upright position relative to the tread surface 16 ( see FIG. 6), wherein they provide the best grip in the ground (road). The tie bars 21 provide an especially good grip if they are positioned with the rigdes and depressions respectively directed as defined above and the chain members 19, 20 provide an especially good grip if they are turned or rotated as defined.

As alternative embodiments, the tie bars 21 and chain members 19, 20 may be non-rotatably connected to each other in another way than illustrated, e.g. by clamping in other mutual positions or by riveting or welding. It is also possible to design the tie bar as a unit with two fixed parts, of which each is disposable on two chain links 29 in each chain member 19, 20. Of course, the number of chain sections, chain members per chain section and tie bars may vary as desired. The cross section and shape of the tie bars 21 may vary, the cross section may e.g. be elliptic or square, but a substantially rectangular cross section is normally preferable. The ridges and depressions of the tie bars 21 may eventually be excluded or have another shape and the chain members 19, 20 must not necessarily be turned or twisted between said tie bars 21.

It is preferable to use the snow chain 7 according to the invention in connection with skid protection devices having a centre member 3, a retaction device 4 and arms 5a–5d of the illustrated or similar type, but the snow chain 7 according to the invention may alternatively be used as a separate member extending around the tread surface of wehicle wheels and clampable against the tread surface.

It is finally noted that the snow chain and other loaded members of the skid protection device are preferably made of a metallic material, resistive plastic material or a combination thereof.

I claim:

1. A snow chain for vehicle wheels comprising:
   (a) a plurality of arms, each arm having a first end mounted to a center member, each arm extending radially outward from the center member to a second end;
   (b) means for retracting the arms to a position adjacent an end side of a vehicle wheel;
   (c) a plurality of yokes, each yoke having a first end connected to the second end of an arm, and each yoke also having a second end with means for joining chain sections, each chain section extending between two yokes; and
   (d) a pluralityof chain sections, each chain section comprising:
      (1) two chain members for extending along a peripheral thread surface of a tire, each chain member having a pluarlity of chain links, at least one chain link of each chain member being detachable connected to at least one of the yokes;
      (2) a plurality of tie bars extending along a transverse axis between the chain members and non-rotatably mounted to the chain members, each tie bar having a clamping portion comprising an edgeways open recess disposed between two members;
   wherein two substantially parallel extending portions of a chain link are disposed within the open recess, one link portion engaging a bottom of the recess while the opposed chain link portion engages the two end members bent toward each other on the outside of the outermost chain link portions in the recess so a chain link of each chain member is non-rotatably connected to each tie bar.

2. A snow chain for vehicle wheels comprising;
   (a) a plurality of arms, each arm having a first end mounted to a center member, each arm extending radially outward from the center member to a second end;
   (b) means for retracting the arms to a position adjacent an end side of a vehicle wheel;
   (c) a plurality of yokes, each yoke having a first end connected to the second end of an arm, and each yoke also having a second end with means for joining chain sections, each chain section extending between two yokes; and
   (d) a plurality of chain sections, each chain secton comprising:
      (1) two chain members for extending along a peripheral thread surface of a tire, each chain member having a plurality of chain links, at least one chain link of each chain member being detachable connected to at least one of the yokes;
      (2) a plurality of tie bars extending along a transverse axis between the chain members and non-rotatably mounted to the chain members, each tie bar having a clamping portion comprising an edgeways open recess disposed between two end members;
   wherein each tie bar compises a longitudinal flat iron bar which, when the snow chain is mounted on the vehicle wheel, is kept in an edgeways position relative to the tread surface by the chain members such that opposing edges of the tie bar face towards and away from the tread surface, the tie bar edges having alternating ridges and depressions disposed thereon, the ridges in the edge facing towards to the tread being positioned substantially opposite to the depressions in the edge facing away from the tread surface and the depressions in the edge facing towards the tread surface being positioned substantially opposite to ridges in the edge facing away from the tread surface, the tie bars also being disposed relative to each other such that, in the longitudinal direction of the snow chain, each ridge of a tie bar is positioned substantially opposite to each depression closest thereto of the adjacent tie bars.

3. The snow chain according to claim 2, wherein the tie bars are substantially identical in shape, adjacent tie bars being rotated 180° relative to each other.

4. A snow chain for vehicle wheels comprising:
   (a) a plurality of arms, each arm having a first end mounted to a center member, each arm extending radially outward from the center member to a second end;
   (b) means for retracting the arms to a position adjacent an end side of a vehicle wheel;
   (c) a plurality of yokes, each yoke having a first end connected to the second end of an arm and each yoke also having a second end with means for joining chain sections, each chain section extending between two yokes; and
   (d) a plurality of chain sections, each chain section comprising:
      (1) two chain members for extending along a peripheral thread surface of a tire, each chain member having a plurality of chain links, at least one chain link of each chain member being detachably connected to at least one of the yokes;
      (2) a plurality of tie bars extending along a transverse axis between the chain members and non-rotatably mounted to the chain members, each tie bar having a clamping portion comprising an edgeways open recess disposed between two end members;

wherein each yoke comprises two shanks, one chain link of each of the two chain members forming part of each chain section being disposed on one of the shanks, the chain links being removable from the shank by releasing a locking means fixable on the yoke.

5. The snow chain according to claim 4, wherein each shank of the yokes has a limited section for the mounting of two chain links and the locking means, the shanks being displaceable by hand toward each other against the action of a spring force permitting the locking means to be placed in a locking position when it is disposed between the chain links in each section preventing the chain links from leaving the section, and wherein the locking means is retained at the yoke, while the shanks, after bringing together thereof, are permitted to spring out against two flange portions of the locking means when the shanks are positioned between the flange portions.

* * * * *